United States Patent [19]
Hock et al.

[11] Patent Number: 5,665,131
[45] Date of Patent: *Sep. 9, 1997

[54] INFLATOR FILTER MADE OF WRAPPED MESH

[75] Inventors: Christopher Hock, Uintah; Linda M. Rink, Liberty; Kurt E. Kottke, Bountiful; Paul Philpot, Layton, all of Utah

[73] Assignee: Morton International, Inc., Chicago, Ill.

[*] Notice: The term of this patent shall not extend beyond the expiration date of Pat. No. 5,407,120.

[21] Appl. No.: 597,332

[22] Filed: Feb. 6, 1996

Related U.S. Application Data

[63] Continuation of Ser. No. 248,939, May 25, 1994, abandoned.

[51] Int. Cl.$^6$ .................. B01D 39/10; B60R 21/28
[52] U.S. Cl. ................... 55/487; 55/486; 55/520; 55/525; 55/DIG. 5; 280/740; 280/742
[58] Field of Search ............ 55/498, 520, DIG. 5, 55/525, DIG. 30, 486, 487; 210/497.1, 497.01, 493.4; 29/902, 905, 163.7, 163.8; 280/740–742

[56] References Cited

U.S. PATENT DOCUMENTS

| | | | |
|---|---|---|---|
| 3,063,888 | 11/1962 | Howard et al. | 55/487 X |
| 3,262,578 | 7/1966 | Dennis | 55/487 X |
| 4,296,084 | 10/1981 | Adams et al. | |
| 4,878,690 | 11/1989 | Cunningham | 280/741 |
| 4,969,999 | 11/1990 | Riddell | 156/157 X |
| 4,998,751 | 3/1991 | Paxton et al. | 280/741 |
| 5,109,772 | 5/1992 | Cunningham et al. | |
| 5,228,891 | 7/1993 | Adiletta | 55/484 |
| 5,230,726 | 7/1993 | Smith et al. | 55/487 |
| 5,308,370 | 5/1994 | Kraft et al. | 55/487 |
| 5,378,015 | 1/1995 | Rink et al. | 280/742 X |
| 5,407,120 | 4/1995 | Philpot | 228/155 |

Primary Examiner—Jeff H. Aftergut
Attorney, Agent, or Firm—Charles N. Lovell; Gerald K. White

[57] ABSTRACT

An improved method for fabricating a filter for use in automotive air bag inflators which comprises forming a hollow cylindrical inner core or combustion screen of filter material and outer filter layers wound outward from the surface of the core so as to be maintained in cylindrical relation thereabout. This invention is specifically directed to an improved filter which does not include a perforated support tube and relies on only the interior combustion screen for support in the final wrapping of the remaining filter structure.

8 Claims, 2 Drawing Sheets

INFLATOR FILTER MADE OF WRAPPED MESH

This is a continuation of application Ser. No. 08/248,939 filed on May 25, 1994, now abandoned.

BACKGROUND OF THE INVENTION

1. Field of the Invention

This invention relates generally to inflatable type modular occupant restraint systems for passenger vehicles, or, as they are more commonly known, air bag restraint systems. More particular, this invention relates to an improved rigid filter assembly for use in a pyrotechnic air bag inflator and a method for manufacturing the filter assembly. The filter functions to cool the hot gases before they reach the air bag and serves to trap particulates and residues generated during ignition so that they do not enter the air bag and contaminate the vehicle.

2. Description of the Related Art

The state of the art today for manufacture of passenger inflator filters consists of metallic screen or mesh materials which are constructed by being wrapped around a rigid perforated cylinder or tube which provides strength and support for the filter. A combustion screen, which provides cooling and helps retain the generant slag inside the filter, is inserted into the interior of the perforated support tube and welded thereto. The use of a perforated support tube adds little value to the filter assembly and/or the performance of the filter in its deployment in air bag inflator systems. Rather, the use of the perforated support tube requires additional assembly operations in that the filter assembly must be clocked during manufacture and assembly of the inflator to provide proper alignment and this adds to the cycle time and cost required to manufacture the inflator. A filter assembly of the aforesaid type is disclosed in U.S. Pat. No. 5,109,772 and is assigned to he assignee of the present invention.

The consistent and economical manufacture of filter assemblies for passenger side inflators which efficiently cool and clean gas from the gas generant is of prime concern. The elimination of parts as well as process steps in the manufacture of such inflators has obvious advantages and benefits. Also advantages provided to the filter in reducing the cycle time for manufacturing the inflator result in obvious economic savings.

SUMMARY OF THE INVENTION

An object of this invention is to provide an improved method of manufacturing air bag inflator filter assemblies which reduces the time required to manufacture a filter assembly for a passenger side automotive air bag inflator. Further, an object of this invention is to provide an improved method of manufacturing a filter assembly which reduces the number of parts required for said assembly. Another object of this invention is to provide an improved filter assembly which does not require a perforated support member and thus eliminates the need for clocking the filter during manufacture and assembly into the inflator housing. Still another object of the invention is to provide a new improved filter of the character described which is relatively low in cost and which provides high cooling efficiency, high uptake collection efficiency of any toxic materials or particulates contained in the expanding gas with relatively little impedance to the flow of gas at high velocities therethrough.

These objectives have been achieved by a novel filter element and a means for manufacturing the same. The filter assembly includes a hollow cylindrical inner core or combustion screen having at least one open end and internal and external surfaces constructed from at least one wrap of expanded metal or metal wire filter material with additional wraps of filter material substantially coextending with the external surface of said inner core and wound outward from said inner core such that the additional filter wraps are maintained in cylindrical relation about said inner core without further structural support.

The filter assembly is made by forming a hollow cylinder of at least one expanded metal or metal wire wrap, sizing and welding said hollow cylinder to form the inner core or interior combustion screen of said filter assembly, wrapping the exterior surface of the hollow cylinder by directly contacting said surface with additional substantially coextending wraps of filter material wound about said hollow cylinder, and joining the trailing end of the radially most outward wrap of filter material to the filter assembly by bonding means so that the outer wraps of filter material are maintained in cylindrical relation about said inner core.

BRIEF DESCRIPTION OF THE DRAWINGS

With this description of the invention, a detailed description follows with reference being made to the accompanying figures of drawings which form part of the specification, and of which.

DESCRIPTION OF THE INVENTION

Figure 1:
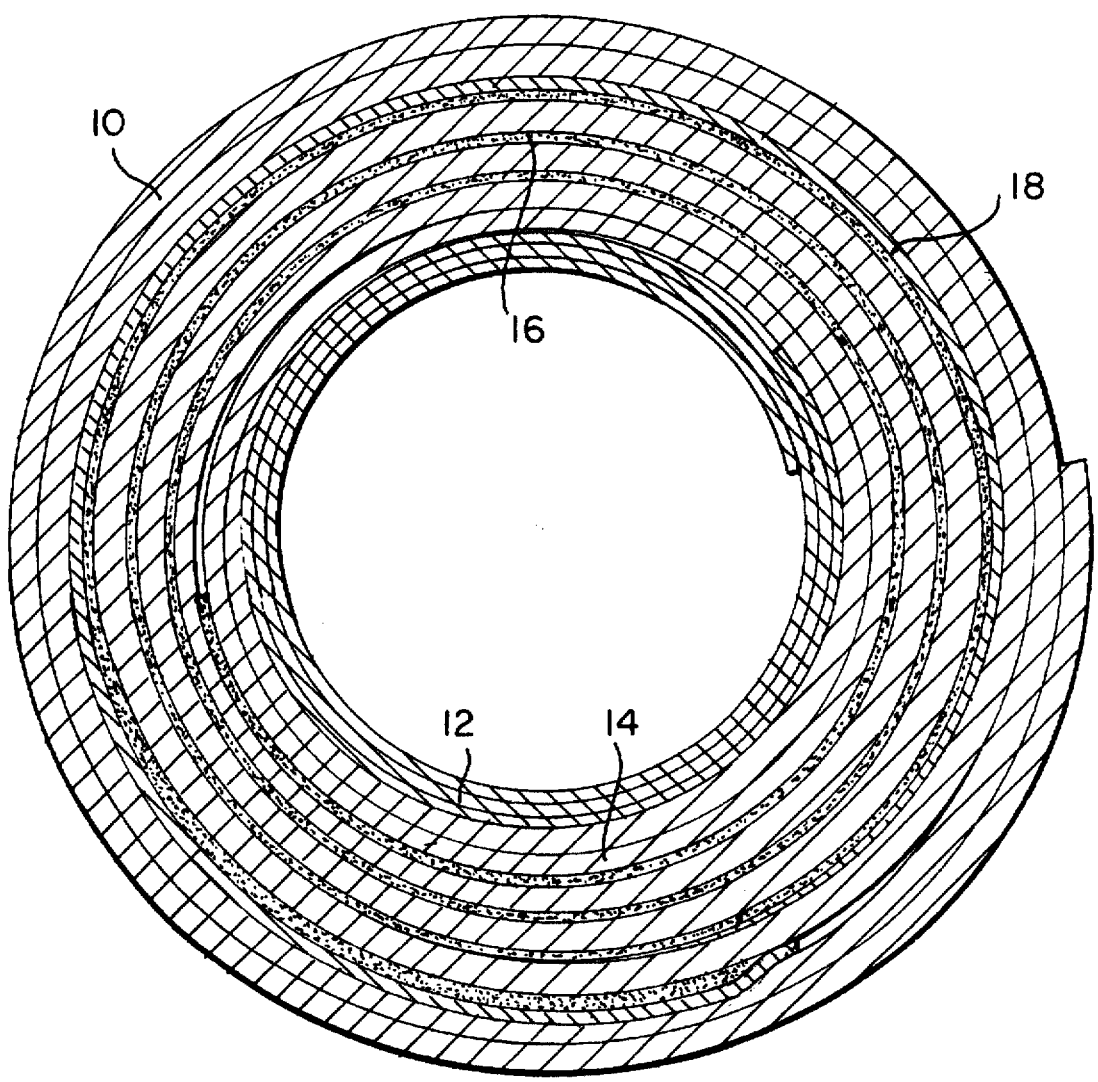
FIG. 1 is a cross-sectional view of the cylindrical filter of this invention showing the individual filter elements.

A filter assembly manufactured by the process of this invention is shown in the sectional view of FIG. 1. The process for making said filter unit according to this invention comprises cutting 30×30 mesh metal woven cloth to length, curling it into a hollow cylindrical member having first and second open ends, sizing and welding to form an inner tube or core. The 30×30 mesh is curled in a preferred method by a two roll former, i.e. a 0.75 inch diameter steel knurled roller and a 2 inch diameter urethane roller, 50 durometer. This two roll former rolls the wire cloth into a capture tube while the wire cloth is being formed. Two finish roll belts assist the wire cloth all the way into the capture tube. Once the wire cloth is completely in the capture tube it is then stripped into a sizing tube. The tube is then sized and welded together by resistance welding. The 30×30 mesh wire cloth tube is stripped from the sizing tube. The outside diameter of the 30×30 mesh inner tube can be held constant by using the capture tube method which wraps the filter inside a mandrel as compared to wrapping the filter outside a mandrel. In a second operation, 18×18 mesh metal woven cloth and 45×170 mesh metal woven cloth are cut to length and welded together on a lay-up table and welding machine to form a wire cloth laminate. Paper filter material is then positioned to the wire cloth laminate. The leading edge of the wire cloth laminate/paper filter subassembly is welded to the exterior surface of the formed 30×30 mesh cylindrical tube and the wire cloth laminate and paper filter are wound outward around the 30×30 mesh inner tube on an outer wrap machine. The trailing edge of the radially most outward portion of said laminate is welded to the thus formed cylindrical filter assembly so that the wire cloth laminate and filter paper are maintained in cylindrical relation about said core.

The thus formed cylindrical filter assembly can be resized by subjecting said assembly to a rotary swaging operation such as described in copending application Ser. No. 248,933, filed May 25, 1994, now U.S. Pat. No. 5,407,120 assigned to the assignee of the present invention and filed on even date herewith. Such resizing may be desirable for optimizing both the cylindricity, i.e. roundness and the outside diameter of the tubular filter assembly as well as reducing scrap loss.

FIG. 1 is a cross sectional view of a preferred cylindrical filter assembly 10. As illustrated in FIG. 1, the filter comprises a hollow cylindrical core 12 and additional layers comprising second, third and fourth wraps 14, 16 and 18 of filter materials. The hollow cylindrical core 12 is made of 30×30 mesh metal woven cloth. The wire cloth laminate/paper filter are made of 18×18 mesh metal woven cloth 14, Lydall 924 paper 16 and 45×170 mesh metal woven cloth 18. In filter assembly 10 of FIG. 1 there is provided three layers of 30×30 mesh metal woven cloth 12 which serve to support the filter and cool gases. Six layers of 18×18 mesh metal woven cloth 14, three layers of Lydall 924 paper filter 16 and one layer of 45×170 mesh metal woven cloth 18 make up the wire cloth laminate/paper filter elements. The 18×18 mesh metal woven cloth also serves to provide structure to the filter and cool gases while the primary function of the paper filter and 45×170 mesh metal woven cloth is filtering and cooling of gases. As further illustrated in FIG. 1, the third and fourth wraps terminate at approximately the same point within the filter assemble.

By way of illustration and not limitation it is noted that in an operative embodiment of FIG. 1 of the invention, the materials of which the filter components are made and the dimensions thereof where relevant are as indicated below:

| Components | Function | Materials | Dimensions |
|---|---|---|---|
| filter cloth 12 | Combustion screen holds large particles and slag. Also provides some initial cooling and supports the filter assembly. | carbon steel | 30 × 30 mesh .011" wire diameter |
| coarse screen filter cloth 14 | Support ceramic paper. Aid in wrapping filter. Provides cooling. Supports fine screen | carbon steel | 18 × 18 mesh .017" wire diameter |
| filter paper Lydall 924 16 | Filters particulates. Cools gas flow. | ceramic mfd. by Lydall | |
| fine filter screen 18 | Filters and cools gases | stainless steel | 45 × 170 mesh |

In the preferred embodiment, the 30×30 mesh, is cut to sufficient length to provide an inner core comprising three layers as shown in FIG. 1 and the 18×18 mesh, the filter paper and the 45×170 mesh materials are cut to sufficient lengths and laid-up in a laminate so as to provide six, three and 1 layers respectively when wound outward around said inner core. However, different meshes, number of layers and/or additional or alternative materials could be used in the filter assembly to tailor the performance to a given need. For example, the function of the inner tube support takes place at three different times. During manufacture of the filter assembly, the tube supports the wraps of filter material which surround it. During the expected lifetime of the inflator the inner tube additionally supports the generant contained within it. During function of the inflator, the inner tube supports and contains the slag which is generated as a product of combustion. Accordingly, the number of wraps of the mesh count of the 30×30 and 18×18 mesh could be varied to increase or decrease the structural characteristics of the filter assembly. For example additional wraps or larger wire diameters could be used to increase strength of the filter assembly. Also the number of wraps or the mesh count of the 30×30 and 18×18 mesh could be varied to increase or decrease the cooling characteristics of the filter assembly. For example, additional wraps, smaller weave or larger wire diameters would increase cooling of the gas. The number of wraps or the mesh count of the 45×170 mesh metal woven cloth or the filter paper could be changed to increase or decrease the filtering and cooling characteristics of the filter assembly. For example, additional wraps or smaller weave of wire cloth would improve the filtering ability of the assembly.

It is to be further understood that stainless steel wire cloth or other materials e.g. aluminum, copper, etc., could be used in place of carbon steel cloth or expanded metal filter materials could be used for making the filter screens. Different commercially available ceramic compositions could be used in place of the Lydall ceramic paper, such as ceramic textiles. Further, the fine screen filter element 18 could be made of carbon steel, fine expanded metal, steel wool or woven ceramic textile materials in keeping with the spirit of the invention.

Expanded metal filter screen is obtained from Exmet Corporation and is formed by simultaneously slitting and stretching using shaped tools which determine the form and number of openings. A 30×30 mesh replacement using Exmet expanded metal would be specified as 8 Fe 10-5/OHXF with 42% open area. A 45×170 mesh replacement using Exmet expanded metal would be specified as 8 SS 15-5/OHXF with 13% open area. The expanded metal is identified by reference to sheet thickness in mils, metal, strand width in mils and mesh or tool designation.

Figure 2:
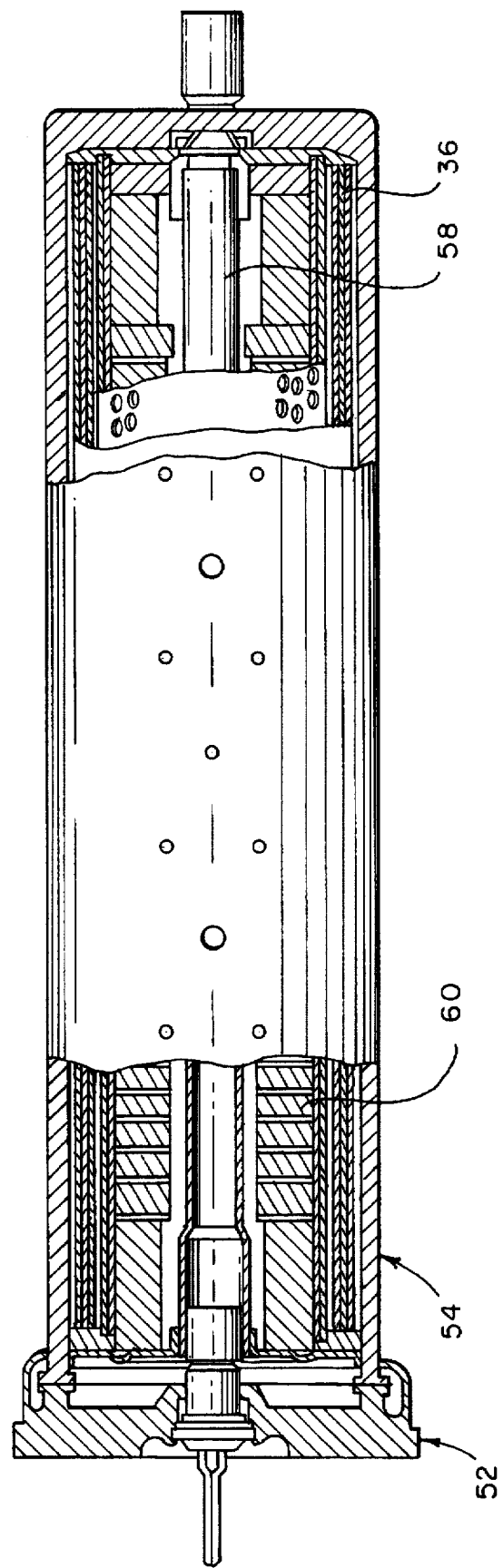
FIG. 2 is a fragmented view illustrating the placement of the filter assembly in a passenger side automotive air bag inflator.

The passenger side air bag inflator filter assembly of this invention, can be used in any of A number of known constructions, including the construction shown in FIG. 2 and illustrated in U.S. Pat. No. 4,296,084 to Schneiter, which patent is assigned to the assignee of the present invention. The inflator 52 includes generally an outer housing 54 into which is inserted the wound filter assembly 36 of this invention. An igniter 58 containing igniter granules and the appropriate ignition system is then inserted into the center of the inflator 52. Gas generant 60 is then loaded into the inflator 52 which is then sealed in a conventional manner known to those in the art. After ignition of the gas generant, the rapidly expanding generated gases flow outwardly from the center of the inflator 52 through the cylindrical filter assembly 36 and heat is absorbed by the filter for cooling the gases. Substantially all of the solid residual matter carried by the gas is trapped and retained in the various wraps of filter material.

Thus, in accordance with the invention, there has been provided an improved method for fabricating filter assemblies for use with automotive air bag inflators which reduce both the process steps and parts required to manufacture said assemblies. Use of a perforated support tube requires clocking the filter screen pack during it's manufacture around the support tube and also clocking the filter assembly into the inflator housing. Thus, there has additionally been provided an improved filter assembly for use in automotive air bags which eliminates the need for clocking the filter during manufacture of the filter and assembly of the inflator and thus reduces the cycle time and steps required in manufacturing inflators containing said filter assembly.

With this description of the invention in detail, those skilled in the art will appreciate that modification may be made to the invention without departing from the spirit thereof. Therefore it is not intended that the scope of the invention be limited to the specific embodiments that have been illustrative and described. Rather, it is intended that the scope of the invention be determined by the scope of the appended claims.

What is claimed is:

1. A gas generator filter assembly having a multiple layered or stack-up wrapped cylindrical configuration consisting essentially of:

a hollow cylindrical inner core having at least one open end and internal and external surfaces constructed from at least one wrap of metal wire mesh or expanded metal filter material, and additional wraps of different filter material emanating from and being substantially coextensive with the external surface of said inner core such that said additional wraps are maintained in cylindrical relation about said core without further structural support, said additional wraps of different filter material comprise second, third and fourth wraps of filter material wrapped outward of said inner core, wherein the leading end of said second wrap is in contact with said core, the leading end of said third wrap is in contact with said second wrap, the leading end of said fourth wrap is in contact with both said second and third wraps and wherein the trailing ends of said third and fourth wraps terminate at approximately the same point within said assembly.

2. A gas generator filter assembly of claim 1 wherein said inner core is formed of three layers of metal cloth.

3. A gas generator filter assembly of claim 2 wherein said inner core is formed of three layers of 30×30 mesh woven cloth.

4. A gas generator filter assembly of claim 3 wherein said second wrap is formed of six layers of 18×18 mesh metal woven cloth, said third wrap is formed of three layers of paper filler and said fourth wrap is formed of one layer of 45×170 mesh metal woven cloth.

5. A gas generator filter assembly of claim 1 wherein said inner core is formed of expanded metal.

6. A gas generator filter assembly of claim 1 which has been worked and resized to improve its cylindricity.

7. A gas generator filter assembly of claim 1 in the asswaged condition.

8. A gas generator filter assembly having a multiple layered or stack-up wrapped cylindrical configuration consisting essentially of:

a hollow cylindrical inner core member having at least one open end and internal and external surfaces constructed from at least one wrap of metal wire mesh or expanded metal filter material, and having additional wraps of different filter material emanating from and being substantially coextensive with the external surface of said inner core member such that said additional wraps are maintained in cylindrical relation about said inner core member without further structural support, said additional wraps of different filter material comprising a three-ply laminate of second, third and fourth wraps filter material concentrically wrapped outward of said inner core member, wherein the leading end of said second wrap is attached to the outer surface of said inner core member and overlapping contact therewith, the leading end of said third wrap is in overlapping contact with said second wrap, the leading end of said fourth wrap is in overlapping contact with said third wrap and is located intermediate said second and third wraps and wherein the trailing ends of said third and fourth wraps terminate at approximately the same point within said assembly.

* * * * *